United States Patent Office 2,795,607
Patented June 11, 1957

2,795,607

PRODUCTION OF THIOETHER DICARBOXYLIC ACIDS

Walter Reppe, Ludwigshafen (Rhine), and Herbert Friederich, Worms, Germany, assignors to Badische Anilin- & Soda-Fabrik Aktiengesellschaft, Ludwigshafen (Rhine), Germany No Drawing. Application October 15, 1952, Serial No. 314,961

Claims priority, application Germany October 17, 1951

6 Claims. (Cl. 260—537)

This invention relates to an improved process for the production of thioether dicarboxylic acids, especially of thiodipropylether $\gamma.\gamma'$-dicarboxylic acid.

It is known that thioether dicarboxylic acids are obtained in the form of their salts when lactones are heated with anhydrous alkali or alkaline earth sulfides or hydrosulfides. This process has given little satisfaction hitherto because, in order to avoid waste by side reactions, it was held to be necessary to employ completely anhydrous sulfides, which are prepared for example by reduction of sulfates with hydrogen, or to employ an excess of anhydrous hydrosulfide; furthermore the yields are fluctuating and incomplete.

We have now found that the said drawbacks can be avoided and salts of thioether dicarboxylic acids can be obtained in a simple manner and in almost quantitative yields by allowing lactones to act at temperatures between about 150° C. and 300° C. on alkali or alkaline earth sulfides or hydrosulfides which are suspended in indifferent organic solvents of high boiling point. It is then even possible to use, instead of anhydrous alkali or alkaline earth sulfides or hydrosulfides, those which contain water.

Suitable lactones are for example gamma-butyrolactone, gamma- or delta-valerolactone, beta-propiolactone, the lactone of angelic acid or the lactone of benzyl alcohol ortho-carboxylic acid.

Examples of suitable organic liquids of high boiling point are tetrahydronaphthalene, diethylbenzene, triethylbenzene or mixtures of the same.

It is also possible, for example, to cover commercial hydrated sodium sulfide ($Na_2S.9H_2O$) with tetrahydronaphthalene and to heat the whole to boiling. The water of crystallisation is thus distilled off. The lactone can then be allowed to flow in gradually while water of crystallisation is still being split off, but it is preferable to heat the mixture until the water of crystallisation has been completely distilled off before the lactone is added. A similar procedure is followed when using sodium sulfhydrate (NaSH) instead of hydrated sodium sulfide, the inflow of the lactone preferably being adjusted to the rate at which it is used up.

In this way a crystal pulp of the salt of the desired thioether dicarboxylic acid is obtained in almost quantitative yield in fine dispersion in the organic liquid.

The working up of the reaction mixture can be carried out in a simple manner for example by filtering off the crystal pulp; it is also possible, however, to add to the solution of the salt of the thioether dicarboxylic acid a sufficient amount of water and to separate the layers formed. The filtrate from the crystal pulp and the non-aqueous layer may be directly used for a fresh batch.

The thioether dicarboxylic acid salts and their aqueous solutions may be used for many purposes as such; if desired the free dicarboxylic acids may be obtained therefrom by acidification. These are valuable intermediates, especially for softening agents and synthetic materials.

The following examples will further illustrate this invention but the invention is not restricted to these examples. The parts are by weight.

Example 1

159 parts of commercial sodium sulfide of the approximate composition 98% $Na_2S$, 1% $H_2O$ and 1% NaOH are suspended in 1000 parts of tetrahydronaphthalene. The suspension is heated to boiling under reflux and 344 parts of gamma-butyrolactone are allowed to flow in during the course of 4 hours while stirring. After boiling for another 4 hours, it is allowed to cool. The precipitate is filtered off by suction, washed with benzene and dried at 80° to 100° C. under reduced pressure. The tetrahydronaphthalene can be used for another batch.

The dry precipitate, after dissolving it in 600 parts of warm water, filtering and acidfying with concentrated hydrochloric acid, yields 389 parts of thiodipropyl ether $\gamma.\gamma'$-dicarboxylic acid having a melting point of 98° C. and an acid value of 540, corresponding to a yield of 94% of the theoretical yield calculated on the gamma-butyrolactone used.

Example 2

240 parts of hydrated sodium sulfide ($Na_2S.9H_2O$) are introduced into 500 parts of a mixture of tri- and polyethylbenzenes boiling at 220° to 280° C. and the whole heated to boiling while stirring until no further water passes over, the distillate being led through a separating vessel and the organic layer continually returned to the boiling vessel. Then, while further stirring and boiling, 172 parts of gamma-butyrolactone are added in a short time. The temperature in the vapour space thus falls to about 200° C. but rises to about 220° C. during the course of a further 9 hours. (If the gamma-butyrolactone be added more slowly, it reacts immediately and the temperature in the vapour space does not fall.) It is allowed to cool and 300 parts of water are added with further stirring. When the precipitate has dissolved, the organic layer is separated off; it may be used directly for a fresh batch. The aqueous layer is filtered and acidified with concentrated hydrochloric acid. 194 parts of the same product as in Example 1 are obtained, corresponding to a yield of 95% of the theoretical yield calculated with reference to the gamma-butyrolactone employed.

Example 3

56 parts of a commercial sodium hydrosulfide of the composition 93% NaSH, 6% of $Na_2S$ and 1% $H_2O$ are finely pulverised or ground under 500 parts of tetrahydronaphthalene. It is heated to 180° C. while stirring and 86 parts of gamma-butyrolactone are allowed to flow in during the course of an hour while stirring. The hydrogen sulfide evolved is collected in caustic soda solution; the sodium sulfide or hydrosulfide thus formed can be employed again. The reaction mixture is stirred for 4 hours at about 200° C. By working up as described in Example 1, pure white thiodipropyl ether $\gamma.\gamma'$-dicarboxylic acid having a melting point of 99° C. is obtained in a practically quantitative yield.

Example 4

106 parts of a commercial sodium hydrosulfide dihydrate of the composition 49% of NaSH, 3.5% of $Na_2S$ and 47.5% of $H_2O$ are heated as described in Example 2 in 500 parts of the polyethylbenzene mixture specified therein until the water has been removed, and then 86 parts of gamma-butyrolactone are added in the course of an hour. The escaping hydrogen sulfide is exploited as in Example 3. By working up, there are obtained 98.5 parts of pure thiodipropylether $\gamma.\gamma'$-dicarboxylic acid of melting point 99.5° C. corresponding to a yield of 95% of the theoretical yield calculated on the butyrolactone employed.

What we claim is:

1. An improved process for the production of a thioether dicarboxylic acid which comprises adding a lactone selected from the group consisting of gamma-butyrolactone, gamma-valerolactone, delta-valerolactone, the lactone of angelic acid, and the lactone of benzyl alcohol ortho-carboxylic acid at ordinary pressures to a boiling suspension of an inert hydrocarbon diluent boiling between about 150° C. and 300° C. and a member of the group consisting of alkali and alkaline earth metal sulfides and hydrosulfides.

2. An improved process for the production of thiodipropylether γ.γ'-dicarboxylic acid which comprises adding gamma-butyrolactone at ordinary pressures to a boiling suspension of tetrahydronaphthalene and hydrated sodium sulfide (Na₂S.9H₂O).

3. An improved process for the production of thiodipropylether γ.γ'-dicarboxylic acid which comprises adding gamma-butyrolactone at ordinary pressures to a boil-suspension of tetrahydronaphthalene and sodium hydrosulfide dihydrate.

4. An improved process for the production of thiodipropylether γ.γ'-dicarboxylic acid which comprises heating hydrated sodium sulfide (Na₂S.9H₂O) suspended in a mixture of tri- and poly-ethyl benzenes at ordinary pressures until no more water passes over and adding gamma-butyrolactone to the suspension while further boiling at ordinary pressures.

5. An improved process for the production of thiodipropylether γ.γ'-dicarboxylic acid which comprises heating hydrated sodium hydrosulfide dihydrate suspended in a mixture of tri- and poly-ethyl benzenes at ordinary pressures until no more water passes over and adding gamma-butyrolactone to the suspension while further boiling at ordinary pressures.

6. An improved process for the production of thiodipropylether-γ.γ'-dicarboxylic acid which comprises adding γ-butyrolactone at ordinary pressures to a boiling suspension of an inert hydrocarbon diluent boiling between about 150° and 300° C. and a member of the group consisting of alkali and alkaline earth metal sulfides and hydrosulfides.

References Cited in the file of this patent

UNITED STATES PATENTS

| | | |
|---|---|---|
| 2,449,987 | Gresham | Sept. 28, 1948 |
| 2,449,989 | Gresham | Sept. 28, 1948 |
| 2,449,996 | Gresham et al. | Sept. 28, 1948 |

OTHER REFERENCES

Gresham et al.: J. Am. Chem. Soc., 70 (1948), 999–1001.

Nishigori et al.: Chem. Abst., 47 (1953), 6345c (effective date 1951, published in Chem. High Polymers (Japan), v. 8, pgs. 253–6).